United States Patent
Stemmle

(10) Patent No.: US 8,326,450 B2
(45) Date of Patent: Dec. 4, 2012

(54) METHOD AND SYSTEM FOR GPS AUGMENTATION OF MAIL CARRIER EFFICIENCY

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 781 days.

(21) Appl. No.: 11/885,230

(22) PCT Filed: Dec. 7, 2005

(86) PCT No.: PCT/US2005/044406
§ 371 (c)(1),
(2), (4) Date: Aug. 28, 2007

(87) PCT Pub. No.: WO2006/063121
PCT Pub. Date: Jun. 15, 2006

(65) Prior Publication Data
US 2009/0005900 A1    Jan. 1, 2009

Related U.S. Application Data

(60) Provisional application No. 60/634,014, filed on Dec. 7, 2004.

(51) Int. Cl.
*G06F 7/00* (2006.01)
(52) U.S. Cl. ......... 700/213; 700/223; 711/147; 718/105
(58) Field of Classification Search ............... 700/223, 700/217, 213; 705/406
See application file for complete search history.

(56) References Cited

U.S. PATENT DOCUMENTS

| | | |
|---|---|---|
| 803,968 A | 11/1905 | Barry |
| 1,423,952 A | 7/1922 | McCracken |
| 1,783,687 A | 12/1930 | Shaw |
| 2,446,610 A | 8/1948 | Renfro |
| 2,852,257 A | 9/1958 | Sperry |
| 3,032,341 A | 5/1962 | Reist |
| 3,055,480 A | 9/1962 | Hyman |

(Continued)

FOREIGN PATENT DOCUMENTS

EP    1202234    5/2002

(Continued)

OTHER PUBLICATIONS

"Development of in-process skew and shift adjusting mechanism for paper handling," American Society of Mechanical Engineers http://www.directtextbook.com, 1998.

(Continued)

*Primary Examiner* — Ajit Patel
*Assistant Examiner* — Myron Wyche
(74) *Attorney, Agent, or Firm* — Marcus P. Efthimiou; Andrew M. Calderon; Roberts Mlotkowski Safran & Cole, P.C.

(57) ABSTRACT

Mail carriers are assisted in delivering mail pieces. Each group of mail pieces is received from a sorting system, for delivery to respective final destinations. Also, the sorting system provides delivery data, preferably in electronic form, about delivering the group of mail pieces. Subsequently, GPS is used to determine a location of the mail carrier along a mail route. Information is then provided to the mail carrier regarding delivery of the group of mail pieces, in response to the location of the mail carrier and in response to the delivery data that was received from the sorting system.

24 Claims, 5 Drawing Sheets

U.S. PATENT DOCUMENTS

| | | |
|---|---|---|
| 3,420,368 A | 1/1969 | Sorrells |
| 3,452,509 A | 7/1969 | Hauer |
| 3,587,856 A | 6/1971 | Lemelson |
| 3,659,890 A | 5/1972 | Renfro |
| 3,757,939 A | 9/1973 | Henig |
| 3,884,370 A | 5/1975 | Bradshaw et al. |
| 3,889,811 A | 6/1975 | Yoshimura |
| 3,901,797 A | 8/1975 | Storace |
| 3,904,027 A | 9/1975 | Gilles et al. |
| 3,904,516 A | 9/1975 | Chiba |
| 3,933,094 A | 1/1976 | Murphy |
| 3,960,264 A | 6/1976 | Carbine et al. |
| 3,008,813 A | 2/1977 | Leersnijder |
| 4,008,813 A | 2/1977 | Leersnijder |
| 4,058,217 A | 11/1977 | Vaughan |
| 4,106,636 A | 8/1978 | Ouimet |
| 4,169,529 A | 10/1979 | Hunter |
| 4,244,672 A | 1/1981 | Lund |
| 4,303,503 A | 12/1981 | de Mimerand et al. |
| 4,507,739 A | 3/1985 | Haruki |
| 4,594,754 A | 6/1986 | Spicer |
| 4,627,540 A | 12/1986 | Takeda |
| 4,632,252 A | 12/1986 | Haruki et al. |
| 4,641,753 A | 2/1987 | Tamada |
| 4,681,213 A | 7/1987 | Winiasz |
| 4,688,678 A | 8/1987 | Zue |
| 4,738,368 A | 4/1988 | Shaw |
| 4,848,538 A | 7/1989 | Vaida et al. |
| 4,868,570 A | 9/1989 | Davis |
| 4,874,281 A | 10/1989 | Bergerioux |
| 4,878,577 A | 11/1989 | Romero Lledo et al. |
| 4,891,088 A | 1/1990 | Svyatsky |
| 4,895,242 A | 1/1990 | Michel |
| 4,920,487 A * | 4/1990 | Baffes ............................ 718/105 |
| 4,921,107 A | 5/1990 | Hofer |
| 4,921,294 A | 5/1990 | Klopfenstein |
| 4,923,022 A | 5/1990 | Hsieh |
| 4,965,829 A | 10/1990 | Lemelson |
| 4,978,117 A | 12/1990 | Maier et al. |
| 5,031,223 A | 7/1991 | Rosenbaum |
| 5,042,667 A | 8/1991 | Keough |
| 5,072,401 A * | 12/1991 | Sansone et al. ............... 700/219 |
| 5,119,954 A | 6/1992 | Svyatsky |
| 5,186,336 A | 2/1993 | Pippin |
| 5,291,002 A | 3/1994 | Agnew |
| 5,470,427 A | 11/1995 | Mikel |
| 5,480,032 A | 1/1996 | Pippin |
| 5,718,321 A | 2/1998 | Brugger |
| 5,838,277 A | 11/1998 | Loomis et al. |
| 5,880,958 A | 3/1999 | Helms et al. |
| 5,881,890 A | 3/1999 | Wiley |
| 5,937,485 A | 8/1999 | Dittmer |
| 5,981,891 A | 11/1999 | Yamashita |
| 6,029,111 A | 2/2000 | Croyle |
| 6,126,017 A | 10/2000 | Hours |
| 6,208,910 B1 | 3/2001 | Michael et al. |
| 6,227,378 B1 | 5/2001 | Jones |
| 6,276,509 B1 | 8/2001 | Schuster |
| 6,286,662 B1 | 9/2001 | Meier |
| 6,347,710 B1 | 2/2002 | Ryan |
| 6,365,862 B1 | 4/2002 | Miller |
| 6,394,449 B1 | 5/2002 | Reist |
| 6,403,906 B1 | 6/2002 | De Leo |
| 6,411,897 B1 | 6/2002 | Gaspard, II |
| 6,435,353 B2 | 8/2002 | Ryan |
| 6,443,311 B2 | 9/2002 | Hendrickson |
| 6,464,067 B1 | 10/2002 | Reist |
| 6,555,776 B2 | 4/2003 | Roth et al. |
| 6,561,339 B1 | 5/2003 | Olson |
| 6,561,360 B1 | 5/2003 | Kalm |
| 6,677,548 B2 | 1/2004 | Robu |
| 6,814,210 B1 | 11/2004 | Hendzel |
| 6,856,860 B2 | 2/2005 | Stringham et al. |
| 6,897,395 B2 | 5/2005 | Shiibashi |
| 6,921,875 B2 | 7/2005 | Hanson |
| 6,946,612 B2 | 9/2005 | Morikawa |
| 6,953,906 B2 | 10/2005 | Burns |
| 6,994,220 B2 | 2/2006 | Schererz |
| 7,004,396 B1 | 2/2006 | Quine |
| 7,111,742 B1 | 9/2006 | Zimmermann |
| 7,112,031 B2 | 9/2006 | Harres |
| 7,112,756 B2 | 9/2006 | Hanson |
| 7,138,596 B2 | 11/2006 | Pippin |
| 7,170,024 B2 | 1/2007 | Burns |
| 7,210,893 B1 | 5/2007 | Overman |
| 7,227,094 B2 | 6/2007 | Oexle |
| 7,235,756 B2 | 6/2007 | De Leo |
| 7,259,345 B2 | 8/2007 | Kechel |
| 7,259,346 B2 | 8/2007 | Svyatsky |
| 7,304,260 B2 | 12/2007 | Boller |
| 7,378,610 B2 | 5/2008 | Umezawa |
| 7,396,011 B2 | 7/2008 | Svyatsky |
| 7,397,010 B2 | 7/2008 | Wilke |
| 7,397,011 B2 | 7/2008 | Berdelle-Hilge |
| 7,464,822 B2 | 12/2008 | Coffelt et al. |
| 2002/0053533 A1 | 5/2002 | Brehm |
| 2002/0055818 A1 | 5/2002 | Gaspard, II |
| 2002/0089434 A1 | 7/2002 | Ghazarian |
| 2002/0139726 A1 | 10/2002 | Roth et al. |
| 2003/0006174 A1 | 1/2003 | Harres |
| 2003/0038065 A1 | 2/2003 | Pippin et al. |
| 2004/0030661 A1 * | 2/2004 | Amato .......................... 705/406 |
| 2005/0131576 A1 * | 6/2005 | De Leo et al. ................ 700/223 |
| 2006/0070929 A1 | 4/2006 | Fry |
| 2006/0124512 A1 | 6/2006 | Quine |
| 2006/0180520 A1 | 8/2006 | Ehrat |
| 2006/0191822 A1 | 8/2006 | Avant |
| 2007/0090029 A1 | 4/2007 | Avant |
| 2007/0131593 A1 | 6/2007 | Burns |
| 2007/0272601 A1 | 11/2007 | Cormack |
| 2008/0011653 A1 | 1/2008 | Stemmle |
| 2008/0012211 A1 | 1/2008 | Stemmle |
| 2008/0027986 A1 | 1/2008 | Stemmle |
| 2008/0093273 A1 | 4/2008 | Stemmle |
| 2008/0093274 A1 | 4/2008 | Stemmle |
| 2008/0164185 A1 | 7/2008 | Stemmle |
| 2009/0005900 A1 | 1/2009 | Stemmle |

FOREIGN PATENT DOCUMENTS

| | | |
|---|---|---|
| EP | 1396595 | 3/2004 |
| EP | 1396595 A1 | 3/2004 |
| EP | 1528496 | 5/2005 |
| FR | 2630412 | 10/1989 |
| GB | 2 382 559 | 4/2003 |
| JP | 1-159088 A | 6/1989 |
| JP | 1-271789 A | 10/1989 |
| WO | WO00/16293 | 3/2000 |
| WO | WO 00/45977 | 8/2000 |
| WO | WO 03/043750 | 5/2003 |

OTHER PUBLICATIONS

"The Role of Intelligent Transportation System (ITS) in Intermodal Air Cargo Operations," Nexter, Dec. 2000 ; Jacob Tsao, et al.

"On the Road to Service," ORMS, Aug. 2000.

PCT Search Report and Written Opinion for related application PCT/US05/44406.

Industrial Embedded HPC Applications-Supercomputer; G. Deconinck; p. 26-27, 1997.

PCT Search Report and Written Opinion for related application PCT/US05/44560.

PCT International Search Report and Written Opinion for related application No. PCT/US05/44413.

US Patent Office Action for corresponding U.S. Appl. No. 12/985,822 dated Aug. 29, 2011.

European Search Report dated May 4, 2011 for corresponding EP Appl. No. 05853356.3-2307.

Final Office Action dated Apr. 28, 2011 for corresponding U.S. Appl. No. 11/885,231.

European Search Report for Appl. No. 11172826.7, issue date Oct. 27, 2011.

Office Action dated Nov. 12, 2010 in U.S. Appl. No. 11/885,231.

Notice of Allowance dated Dec. 29, 2010 in U.S. Appl. No. 11/885,242.

Final Office Action dated Aug. 24, 2010 in U.S. Appl. No. 11/885,242.
Office Action dated Mar. 10, 2010 in U.S. Appl. No. 11/885,242.
European Search Report dated Dec. 12, 2010 in EPO Application No. EP05853349.

Communication pursuant to Article 94(3) EPC for Appl. No. 11172826.7, issue date Jun. 19, 2012.

* cited by examiner

METHOD AND SYSTEM FOR GPS AUGMENTATION OF MAIL CARRIER EFFICIENCY

CROSS-REFERENCE TO RELATED APPLICATION

The present application claims priority to U.S. Provisional Application No. 60/634,014 filed Dec. 7, 2004 which is also incorporated by reference herein.

TECHNICAL FIELD

The present invention relates generally to mail delivery, and more particularly to electronically assisted mail delivery.

BACKGROUND OF THE INVENTION

Recently, progress has been made in streamlining mail sortation. For example, U.S. Provisional Patent Application Ser. No. 60/589,634, filed Jul. 21, 2004 is incorporated herein by reference. That previous invention used a folder/divider system for escorting mail through a sortation system. One aspect of this progress has been an increased use of electronic databases to record destinations of mail pieces, and to associate those destinations with respective folder/dividers. This electronic data regarding the destination addresses of surface mail has not yet been exploited at the delivery end, after a carrier has obtained sorted mail from a sorting system.

The posts around the world are very interested in ways for making mail carriers more efficient. The USPS recently engaged four suppliers to develop methods of merging flats and letters mail streams and wrapping all the mail for each delivery point in a packet. This initiative was intended to reduce the amount of time each carrier must spend manually sorting mail for the route each morning before leaving the DDU (Destination Delivery Unit=local post office), and reduce "fingering time" in which the carrier determines how many pieces are to be delivered to each address. Fingering time varies between 20 and 45 seconds per address.

Mailers and mail recipients have indicated displeasure with the USPS' plans to bundle or wrap mail for each address into packets. If the USPS heeds these warnings, they will lose some of the efficiency because the fingering time will be not be reduced as much as planned.

Additionally, posts face another issue related to carrier efficiency. Since carriers work a five day week, and mail must be delivered six days a week, at least one day each week, a substitute carrier must be used on each route to sort and deliver the mail. Also, when a carrier is on vacation, or calls in sick, substitutes must be used. The substitutes are not as familiar with the route as the assigned carrier, so they take longer to sort the mail, learn the route, and finger the mail while in transit.

SUMMARY OF THE INVENTION

The present invention assists a mail carrier to deliver a group of mail pieces. The group of mail pieces is received from a sorting system, for delivery to respective final destinations. Also, the sorting system provides delivery data, preferably in electronic form, about delivering the group of mail pieces. Then, a global positioning system (GPS) is used to ascertain a location of the mail carrier along a mail route. And, information is provided to the mail carrier regarding delivery of the group of mail pieces, in response to the location of the mail carrier and in response to the delivery data that was received from the sorting system. For example, the mail carrier is alerted regarding the number of packages or mail pieces to be delivered, as a function of where the carrier is located.

The delivery data can include not just data about the destinations of mail to be delivered, but can also include data about the delivery route, including driving directions. This is particularly useful if the mail carrier is a new mail carrier for the mail route, or if the mail carrier is a substitute mail carrier for the mail route, or if the mail carrier is temporarily assigned an expanded route.

The delivery data received from the sorting system may include data regarding deliveries to the respective final destinations. In that case, the information provided to the mail carrier along his or her route includes guidance regarding deliveries that are upcoming soon along the mail route. Such guidance can describe what number of pieces or what types of pieces are to be delivered to each of the respective final destinations. However, even if the delivery data includes details about upcoming deliveries along a route, the mail carrier can have an option such that the information to the mail carrier additionally includes driving directions. The guidance provided to a carrier can usefully include a description of delivery points that are to be bypassed due to the number of mail pieces being zero for that delivery point.

It may happen that the mail carrier is temporarily assigned to an expanded route and another mail carrier is temporarily assigned to a reduced route, in order to more equally distribute work for the two mail carriers. Preferably, the mail pieces received from the sorting system would be sorted according to these temporary assignments. The information provided to the mail carrier can be provided verbally or visually or both, by an electronic device.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

BEST MODE FOR CARRYING OUT THE INVENTION

Figure 1:
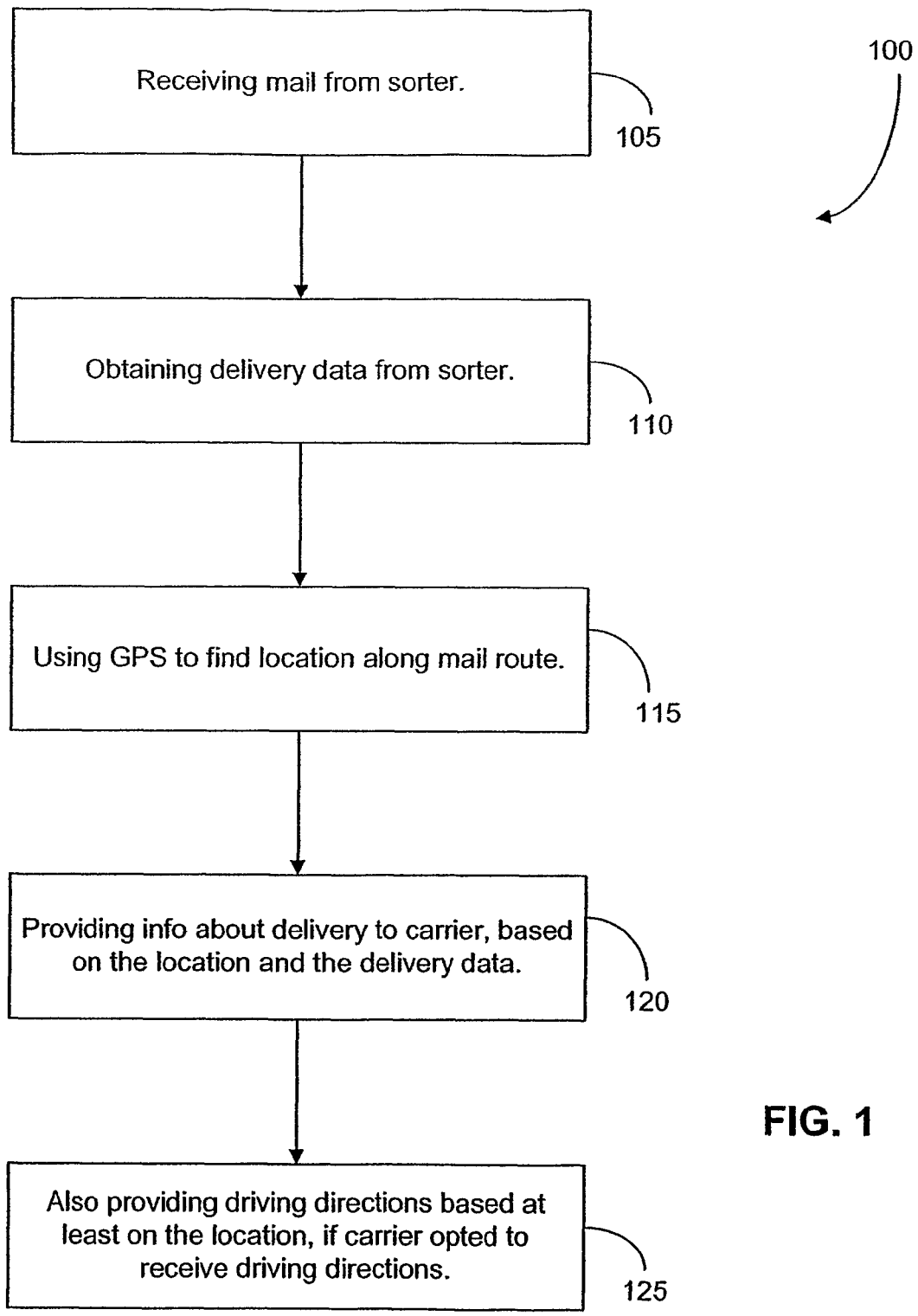
FIG. 1 is a flow chart showing a first method of the present invention.

This invention helps make carriers (and substitute carriers) more efficient by using the information gathered by the delivery sequence sorter, and information about the delivery route, combined with GPS (global positioning systems) technology.

Carrier delivery sequence sorters capture information on every mail piece on a route including how many pieces are to be delivered to each address. Additionally, information from special handling items (registered mail, etc), and parcels can be scanned for each route. This information along with route delivery sequence information is loaded into an electronic storage device having a memory, a method of communicating with an operator such as a display or an audio system, and a GPS technology. This combination of capabilities is hereafter referred to as a GPS system. The GPS system can either be a handheld device, or a GPS/map display having verbal instruction capability—such as currently available for cars. The GPS system gives substitute carriers precise information on the delivery sequence of the route while the carrier is delivering the mail.

Additionally, as the carrier approaches each delivery point, the GPS device tells the carrier how many mail pieces to deliver to that address. These might be verbal or visual prompts such as: "Three pieces of mail for this address", or "no mail for this address, so proceed to the next one", or "you have two special delivery items for this address."

This invention eliminates the need for the carrier to finger through the mail to determine how many pieces are to be delivered to each address, eliminates the need for the carrier to be familiar with the route, and eliminates the need to remember when special items and parcels need to be delivered to each address. Thus, it makes both the mail carrier and substitute carriers far more efficient. The USPS has a stated goal of improving last mile efficiency.

This invention significantly improves the efficiency of mail carriers in two ways. First, it uses GPS technology combined with route information to guide substitute carriers along an unfamiliar route with specific instructions on the specific delivery sequence. Second, information generated by the delivery sequence sorter on the number of mail pieces to be delivered to each address is loaded into the memory of the GPS device each day. Information on special items is also loaded into the memory of the GPS. On the route, the GPS gives precise instructions to the carrier at each address on the number of mail pieces, parcels, and special items are to be delivered to that address.

These improvements eliminate backtracking to deliver missed items, and it reduces the amount of time the carrier spends at each address fingering through the mail to determine how many pieces are to be delivered to each address.

If this invention is successful in saving each carrier only 10 seconds at each address, and the average route in the US has 600 addresses, each carrier will save 1.67 hours delivering the mail every day. There are about 130,000 routes in the USA, and the mail is delivered 300 days each year. If the average salary for carriers is, say $45,000 per year, this savings of only 10 seconds per address will add up to savings of $1.4 billion each year.

Additional savings will be available to the USPS by enabling substitute carriers to be nearly as efficient as the regularly assigned carriers. The present invention will enable managers at the posts to optimize the routes on a daily basis based on the volume of mail for each address. So, on a given day, if one carrier has a heavier than normal amount of mail to deliver, and another carrier has a lighter than normal amount, the manager can dynamically modify the two routes so that each carrier has about the same amount of work to do. The GPS system along with the information on the mail to be delivered at each stop will enable the carrier with the lighter initial load to be efficient in delivering mail to a portion the other route. This will reduce overtime, and allow the managers to optimize workloads for all carriers each day based on mail volume information.

Key elements of this system and method include a GPS device having a display, and/or audible prompts, a memory loaded with information about the carrier route and delivery sequence. Data on the number of pieces to be delivered to each address on the route, can be downloaded into the GPS device memory each day based on information developed by a delivery sequence sorter during sorting operations. The system furthermore includes data from other items to be delivered (registered mail, parcels, etc), which is also loaded into the GPS system memory.

The GPS device guides carriers unfamiliar with the route through a delivery sequence that matches the delivery sequence into which the mail pieces were sorted. Additionally, at each stop, the GPS device advises the carrier on how many pieces are do be delivered, and if there are any special items to be delivered. Generally, if the GPS says "three pieces for this address", they will be the next three pieces in the tray or bag—so the carrier will not have to finger through the mail to read each address to determine the number of pieces. This system will save the carrier time at each stop.

Referring now to the figures, FIG. 1 is a flow chart illustrating an embodiment 100 of the present method. The carrier receives 105 mail from the sorter (i.e. from the sorting system). The carrier also receives 110 delivery data from the sorter. Subsequently, the global positioning system (GPS) is used 115 to find the carrier's location along the mail route. Then, information is provided 120 to the carrier regarding delivery of the mail pieces, based on the location of the carrier and on the delivery data previously received from the sorter. Also, driving directions can be provided 125 to the carrier based on the location and/or based on the delivery data, if the carrier opted to receive driving directions.

Figure 2:
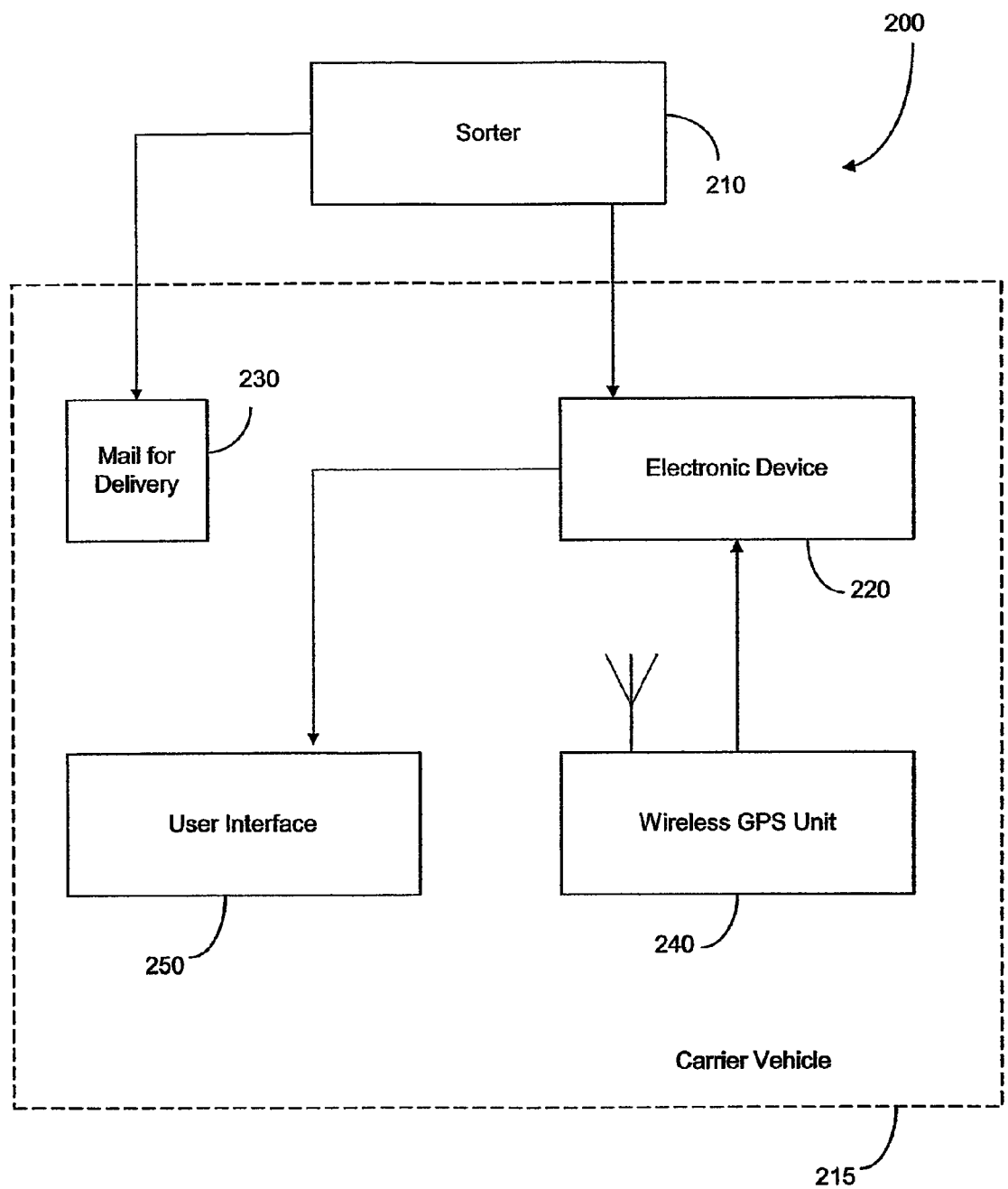
FIG. 2 is a block diagram showing a first system according to the present invention.

Turning now to FIG. 2, a system 200 is shown for implementing the present invention. The sorter 210 provides mail 230 to the carrier vehicle 215. The sorter 210 also provides delivery data to an electronic device 220 that accompanies the carrier vehicle on the delivery route. Also in the carrier vehicle is a GPS unit 240 which provides location coordinate data to the electronic device 220. The electronic device 220 is then able to give guidance to the carrier via a user interface 250, regarding delivery of the mail 230. This guidance may include alerts that a delivery is coming up, or driving directions, or instructions to skip an address because there will be no deliveries today, or details about how many items are to be delivered to the next address.

Figure 3:
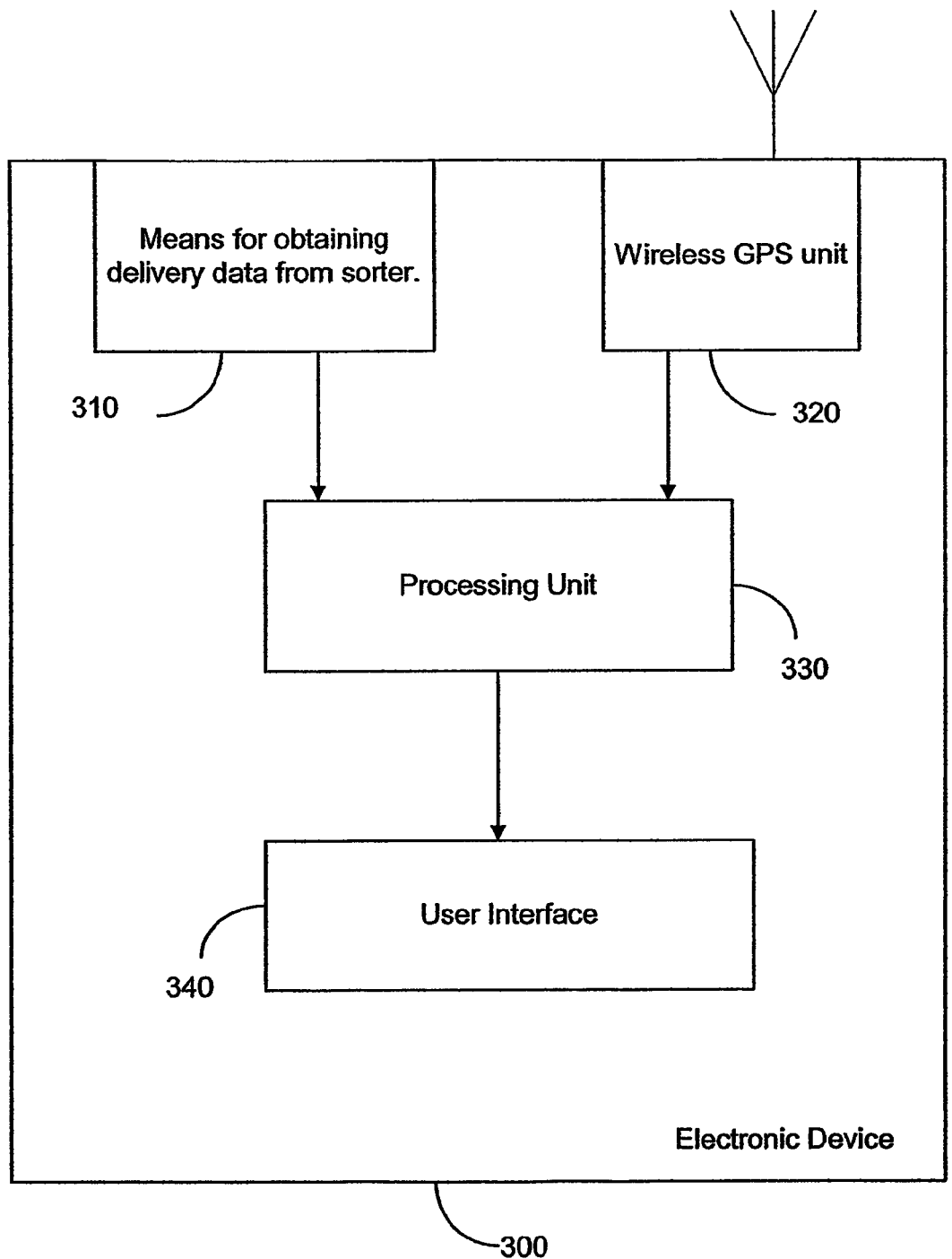
FIG. 3 is a block diagram showing an electronic device according to an embodiment of the present invention.

FIG. 3 shows a consolidated electronic device 300 according to an embodiment of the present invention. A GPS unit 320 enables the device to find out its position coordinates, and those coordinates are then provided to a processing unit 330. Delivery data has already been provided to the processing unit and stored in memory therein, via means 310 which may simply be an input port. Like the coordinate data, the delivery data is also provided to the processing unit 330. Then, the processing unit is in a position to give guidance to the user, via a user interface 340.

Figure 4:
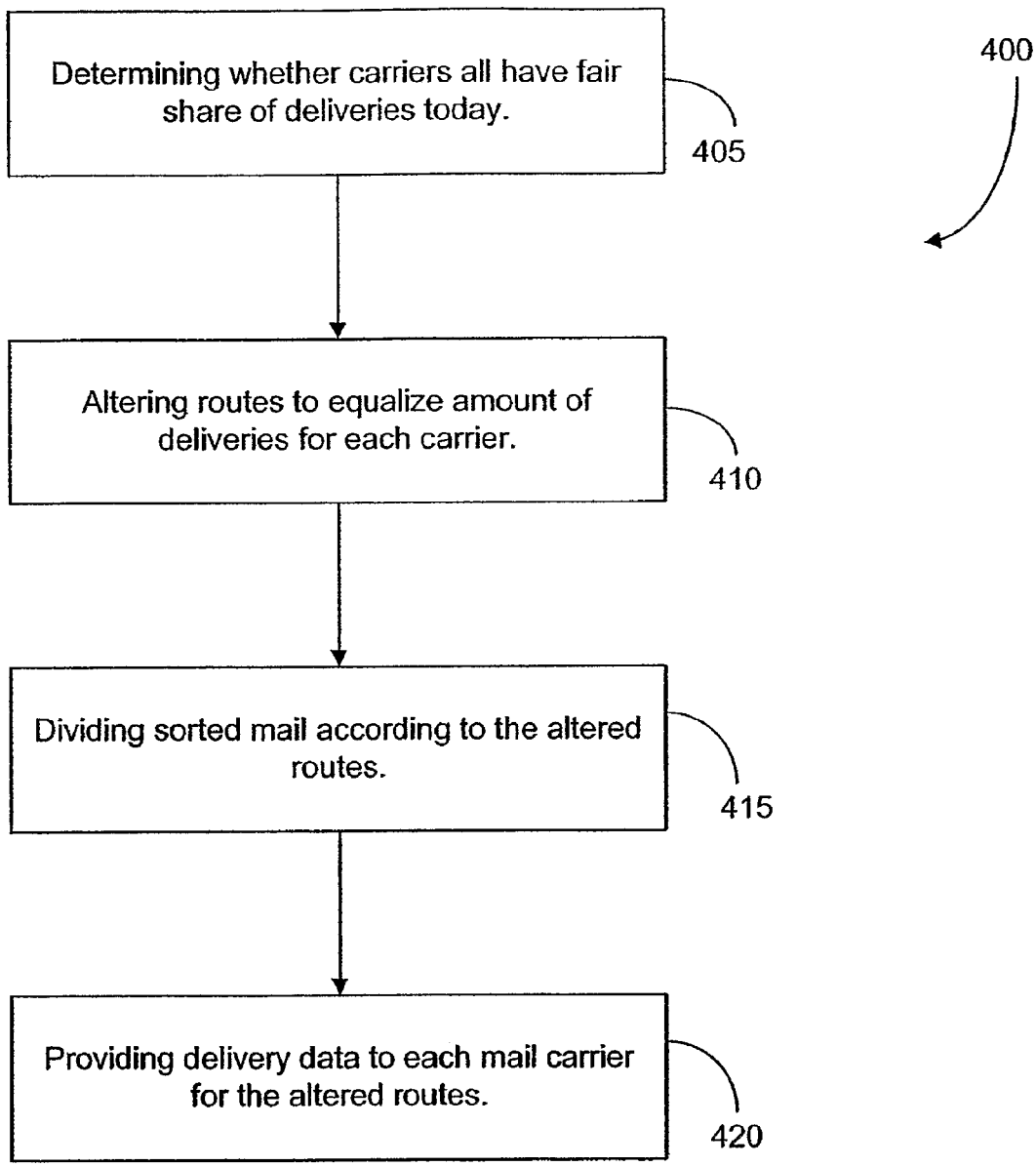
FIG. 4 is a flow chart showing a second method of the present invention.

Turning now to FIG. 4, this method 400 is for altering mail carrier routes. It is determined 405 whether today's workload is even divided between the carriers. For example, some carriers might have an extraordinarily large amount of mail to deliver on their route today, while other carriers might have an extraordinarily small amount. If there are substantial differences in workloads, then it may be possible to alter 410 routes in order to make the delivery amounts for each carrier more equal. In that case, a worker divides the sorted mail 415 according to the altered routes. That mail is provided to the carriers, along with providing 420 delivery data for the altered routes. In a situation like this, a carrier may well end up on unfamiliar territory, and therefore automatically receiving GPS-based driving directions could be particularly useful.

Figure 5:
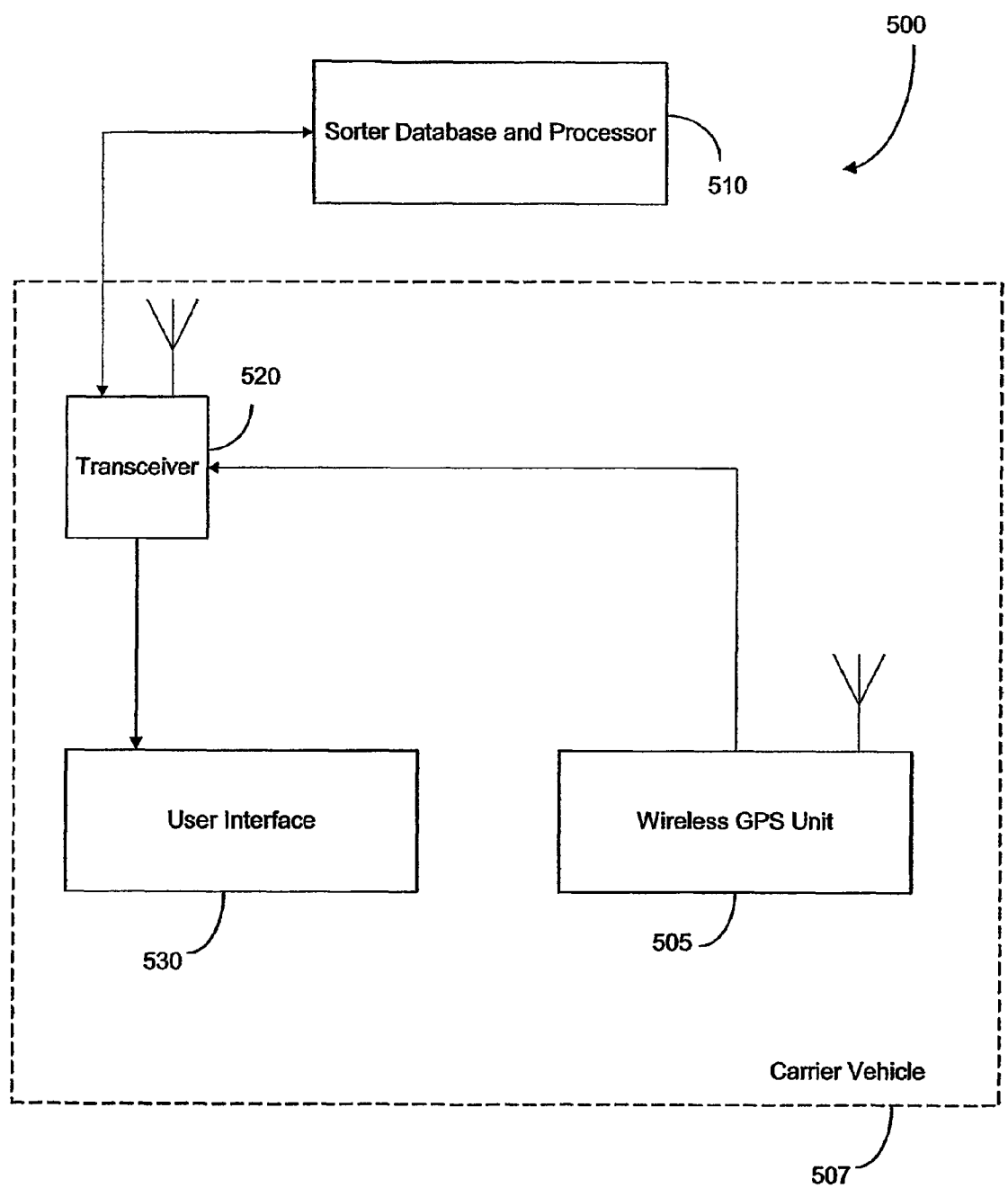
FIG. 5 is a block diagram showing a second system according to the present invention.

FIG. 5 illustrates another system 500 according to the present invention. In this embodiment, processing is done at a postal facility or the like, instead of within the carrier vehicle 507. A GPS unit 505 reports position data to a transceiver 520, which conveys the position data to a sorted mail database and processor 510 located at a postal facility (e.g. at a headquarters location). The processor can then provide guidance to the postal carrier via the transceiver 520 and interface 530. One advantage of letting a remote unit like 510 do this work is that such a unit would have more processing power than could be conveniently fitted into a carrier vehicle, and such processing power could be used to give guidance to several carriers at the same time. Another advantage would be that the carrier would not have to make sure that any data has been transferred to the carrier vehicle.

It will be understood by those skilled in the art that the configurations depicted in FIGS. 2, 3 and 5 may be adapted to battery operated handheld devices to be carried by the mail deliverers on walking routes. The same information on the number and types of mail pieces to be delivered can be conveyed by the device as the carrier approaches each address.

It is to be understood that all of the present figures, and the accompanying narrative discussions of best mode embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures described in this application can be implemented by a variety of different combinations of hardware and software, and in various configurations which need not be further elaborated herein.

What is claimed is:

1. A method of assisting a mail carrier to deliver a group of mail pieces, comprising:
   receiving the group of the mail pieces from a sorting system, for delivery to respective final destinations;
   altering mail carrier routes based on a volume of mail pieces that have to be delivered by the mail carrier, the altering comprising:
      determining that the volume of the mail pieces for each carrier route is not evenly distributed for each mail carrier; and
      substantially equalizing the volume of the mail pieces for each carrier route such that work load allocation is optimized for each mail carrier;
   obtaining delivery data about delivering the group of mail pieces based on the altered mail carrier routes;
   using a global positioning system to ascertain a location of the mail carrier along a mail route based on the received group of the mail pieces;
   providing information to the mail carrier regarding delivery of the group of mail pieces, in response to the location of the mail carrier and in response to the delivery data; and
   describing what number of pieces and what types of pieces are to be delivered to each of the respective final destinations.

2. The method of claim 1, further including providing data regarding the mail route, and wherein the information to the mail carrier includes route directions.

3. The method of claim 1, wherein the delivery data includes data regarding deliveries to the respective final destinations, and wherein the information to the mail carrier includes guidance regarding the deliveries to a plurality of the respective final destinations which are upcoming along the mail route.

4. The method of claim 3, further comprising the step of providing an option to the mail carrier such that the information to the mail carrier also includes directions to the delivery destinations.

5. The method of claim 1, wherein the guidance includes a description of delivery points that are to be bypassed due to the number of pieces being zero.

6. The method of claim 2, wherein a mail carrier is temporarily assigned an expanded route and another mail carrier is temporarily assigned a reduced route, wherein the expanded route and the reduced route are calculated to more equally distribute work for the mail carrier and the another mail carrier, and wherein the groups of mail pieces and delivery data are modified according to the expanded and reduced routes.

7. The method of claim 1, wherein the delivery data is also used by the sorting system to sort the group of mail pieces.

8. The method of claim 1, wherein the step of providing the information to the mail carrier is performed from the group consisting of verbal and visual communications.

9. The method of claim 1, wherein the delivery data is obtained from the sorting system.

10. A delivery system for assisting a mail carrier to deliver a group of mail pieces, comprising:
    at least one mail container for receiving the group of the mail pieces from a sorting system, the group of mail pieces being for delivery to respective final destinations wherein the sorting system optimizes mail carrier routes based on a volume of mail pieces that have to be delivered by the mail carrier such that work load allocation is substantially equal amongst mail carriers by first determining that that the volume of the mail pieces for each carrier route is not evenly distributed for each mail carrier;
    an electronic device for obtaining delivery data about delivering the group of mail pieces;
    a wireless unit for using a global positioning system to ascertain a location of the mail carrier along a mail route; and
    a user interface for providing information to the mail carrier regarding delivery of the group of mail pieces, in response to the location of the mail carrier and also in response to the delivery data.

11. The delivery system of claim 10, wherein the delivery data includes data regarding the mail route, and wherein the information to the mail carrier includes route directions.

12. The delivery system of claim 11, wherein the mail carrier is a new mail carrier for the mail route, or the mail carrier is a substitute mail carrier for the mail route, or the mail carrier is temporarily assigned an expanded route.

13. The delivery system of claim 10, wherein the delivery data includes data regarding deliveries to the respective final destinations, and wherein the information to the mail carrier includes guidance regarding the deliveries to a plurality of the respective final destinations which are upcoming along the mail route.

14. The delivery system of claim 13, wherein the guidance describes what number of pieces and what types of pieces are to be delivered to each of the plurality of the respective final destinations.

15. The delivery system of claim 13, wherein the user interface is also for providing an option to the mail carrier such that the information to the mail carrier also includes route directions.

16. The delivery system of claim 14, wherein the guidance includes a description of delivery points that are to be bypassed due to the number of pieces being zero.

17. The delivery system of claim 12, wherein the mail carrier is temporarily assigned the expanded route and another mail carrier is temporarily assigned a reduced route, wherein the expanded route and the reduced route are calculated to more equally distribute work for the mail carrier and the other mail carrier, and wherein the group of mail pieces received from the sorting system has been modified according to the expanded route.

18. The delivery system of claim 10, wherein the delivery data is also used by the sorting system to sort the group of mail pieces.

19. The delivery system of claim 10, wherein the user interface is for providing the information to the mail carrier from the group consisting of verbal and visual communications.

20. The delivery system of claim 10, wherein the delivery data is obtained from the sorting system.

21. An electronic device for assisting a mail carrier to deliver a group of mail pieces that is received from a sorting system, the group of mail pieces being for delivery to respective final destinations, comprising:

a system for obtaining delivery data about the group of mail pieces and optimizing mail carrier routes based on a volume of mail pieces that have to be delivered by the mail carrier, the system:

determining that the volume of the mail pieces for each carrier route is not evenly distributed for each mail carrier; and substantially equalizing the volume of the mail pieces for each carrier route;

a wireless unit including a global positioning system to ascertain a location of the mail carrier along a mail route; and a user interface for providing information to the mail carrier regarding delivery of the group of mail pieces, in response to the location of the mail carrier and also in response to the delivery data, wherein the information includes an amount and what types of mail pieces to be delivered to the respective final destinations.

22. The electronic device of claim 21, wherein the delivery data is obtained from the sorting system.

23. The method of claim 1, further comprising dividing the sorted mail pieces according to the altered mail carrier routes.

24. The method of claim 23, wherein the providing information includes providing the altered mail carrier routes.

* * * * *